United States Patent [19]
Collisson et al.

[11] Patent Number: 5,270,888
[45] Date of Patent: Dec. 14, 1993

[54] COMPOSITE SLIDER HEAD WITH REDUCED READBACK OSCILLATION

[75] Inventors: Craig Collisson; Tom Tuchscherer, both of Santa Barbara, Calif.

[73] Assignee: Applied Magnetics Corporation, Goleta, Calif.

[21] Appl. No.: 841,612

[22] Filed: Feb. 21, 1992

[51] Int. Cl.⁵ .................................................. G11B 5/60
[52] U.S. Cl. ...................................................... 360/103
[58] Field of Search ................................. 360/103-104

[56] References Cited
U.S. PATENT DOCUMENTS 4,768,121  8/1988  Nakashima ........................ 360/103
4,905,111  2/1990  Tuma ................................. 360/126

Primary Examiner—A. J. Heinz
Attorney, Agent, or Firm—Marvin E. Jacobs

[57] ABSTRACT

The readback oscillations from a ceramic-ferrite composite head are substantially reduced by applying a dampening material, such as an epoxy coating, to the surface of the slider body--preferably to one or both side edges or to the trailing edge of the slider body.

18 Claims, 3 Drawing Sheets

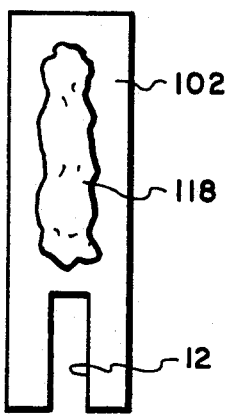
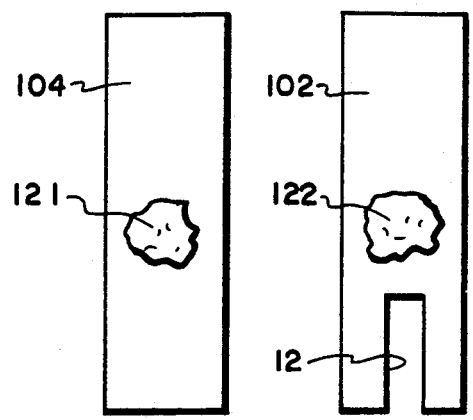
Fig. 6.   Fig. 7.   Fig. 8.   Fig. 9.
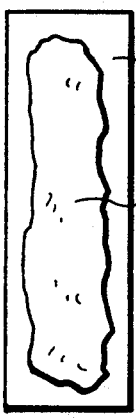
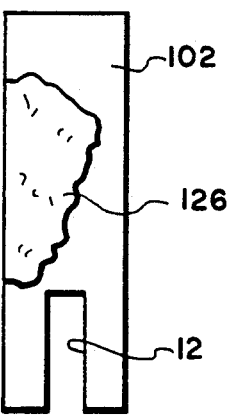
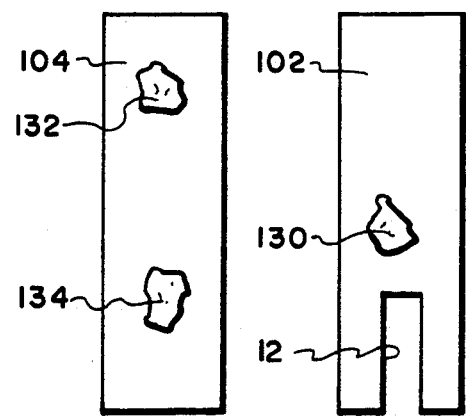
Fig. 10.   Fig. 11.   Fig. 12.   Fig. 13.
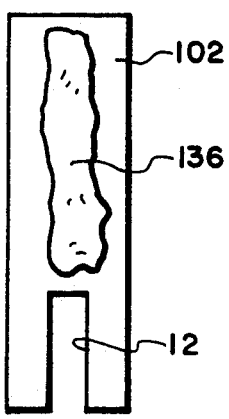
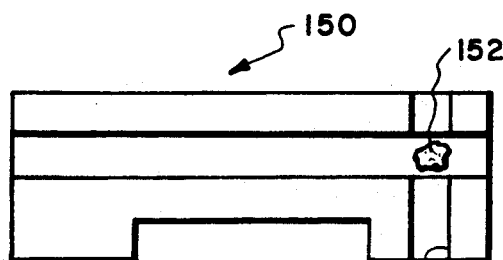
Fig. 14.   Fig. 15.   Fig. 16.

COMPOSITE SLIDER HEAD WITH REDUCED READBACK OSCILLATION

TECHNICAL FIELD

The present invention relates to magnetic recording heads, and, more particularly, this invention relates to composite magnetic heads for disk drives having reduced readback oscillation and to methods of manufacturing such heads.

BACKGROUND OF THE INVENTION

Manufacturers of disk drives are requiring higher storage capacity. Disk drives used in portable computers must be able to withstand the shocks encountered during handling and travel. Monolithic ferrite heads, though less costly than composite heads, do not exhibit sufficient shock resistance. Thin film heads have several desirable attributes. They do not require winding, machining and assembly—all labor intensive tasks required in ferrite head manufacturing. However, thin film heads are more costly to manufacture than composite heads.

Composite ceramic-ferrite heads are very rugged since the magnetic core is glass bonded to a strong ceramic slider. Though more expensive then monolithic heads, composite heads have a potential of higher track density. Moreover, since the magnetic core can be formed with parallel sides, composite heads have a more focused magnetic flux field for writing.

However, composite heads containing single crystal ferrite (SCF) cores exhibit a readback oscillation when a write current is shut off, and the head is placed in a read mode. The readback oscillation interferes with the read operation until it is dampened. This can take 15-20 micro seconds depending on the severity of the oscillation and can also cause servo errors in the drive.

STATEMENT OF THE PRIOR ART

All prior attempts to reduce this feedback oscillation were directed at the core or the coil. It was believed that the readback oscillation resulted from the core coupling to the coil. An epoxy material was potted onto the core and/or the coil to mechanically couple the core and coil and eliminate the oscillations at the source. An epoxy was applied to the core wires and wicked to the center of the coil. The epoxy was cured. This "epoxy in the coil" process did, in fact, reduce the readback oscillation by a small degree. More epoxy was added to the coil with little improvement. Though not understood at the time, the slight reduction in oscillation might be due to contact of the coil epoxy with the surface of the slider body. The "epoxy in the coil process" is cumbersome, is not very reliable, is not very effective, provides poor yields and requires 100% testing of each composite head.

STATEMENT OF THE INVENTION

It has now been discovered according to this invention that the readback oscillation can be significantly reduced by applying a dampening material to the slider body. The dampening material is readily applied to the surface of the slider without interfering with the air-bearing surface (ABS) or the core or coil. The dampened SCF-composite slider of the invention makes the use of SCF cores more cost effective. A SCF-composite slider has significantly better parametric performance than a poly-crystal composite slider. It is readily suited for high performance drives and is requested by disk drive manufacturers. However, the expensive testing and high yield loss caused by the oscillation problem makes this product very expensive. The SCF-composite-dampener head of the invention should be capable of manufacture in near 100% yield as far as dampened oscillation is concerned. The testing can be reduced to an audit level or eliminated. The head of the invention will have lower cost and greater availability.

The present invention is based on recognizing the role magnetostriction plays in readback oscillation. It is believed that when a write current is applied to a SCF core, the core begins to vibrate due to the magnetostrictive nature of the material. The slider body then begins to vibrate at some resonant frequency since the core is coupled to the slider body by the rigid glass bond connecting the core and the slider body. When the write current is turned off, the vibration driving the core and slider body is removed. However, the more massive slider body continues to vibrate since it requires more time to dampen its vibrations. During this period the slider body now becomes the driver and drives the core into vibration. The SCF core then sets up a magnetomotive force due to the excitation from the slider body. The magnetomotive force is then transmitted to the coil to induce a voltage which is detected as the readback oscillation.

The slider dampening theory is confirmed by the elimination and/or reduction of readback oscillation by applying a dampening material to the slider body. The dampening material can be a viscoelastic dampening medium, common fabric or plastic tapes with adhesive backing, or various thermosetting resins such as epoxies. It has been discovered that the material can be applied to any surface of the slider body, However, it is preferred to apply the dampening material to the side or back edges of the slider and to leave the top or bottom ABS surface free of foreign material. Dampening is increased if the dampening material is spread over a large area rather than concentrated in a small region. Tests have demonstrated that the composite cores containing the dampening material of the invention consistently exhibit readback oscillation of less than 50 micro volts at 15 micro seconds after shut-off of the write current.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 6 is a schematic view of a slider body illustrating application of a large amount of dampening material to the non-core side of a slider body;

FIG. 7 is a schematic view illustrating the application of a large amount of dampening material to the core side of a slider body;

FIG. 8 is a schematic view of the non-core side of a slider body illustrating the application of a small dab of dampening material;

FIG. 9 is a schematic view of the core side of a slider body illustrating the application of a small dab of dampening material;

FIG. 10 is a schematic view of the non-core side of a slider body illustrating the application of a very large amount of dampening material;

FIG. 11 is a schematic view of the core side of a slider body illustrating the application of a very large amount of dampening material;

FIG. 12 is a schematic view of the non-core side of a slider body illustrating the application of two small dabs of dampening material;

FIG. 13 is a schematic view of the core side of a slider body illustrating the application of a single dab of dampening material;

FIG. 14 is a schematic view of the non-core side of a slider body illustrating the application of a very light lo amount of dampening material;

FIG. 15 is a schematic view of the core side of a slider body illustrating the application of a very light amount of dampening material;

FIG. 16 is a schematic view of the trailing edge of a slider body illustrating the application of dampening material.

DETAILED DESCRIPTION OF THE INVENTION

Figure 1:
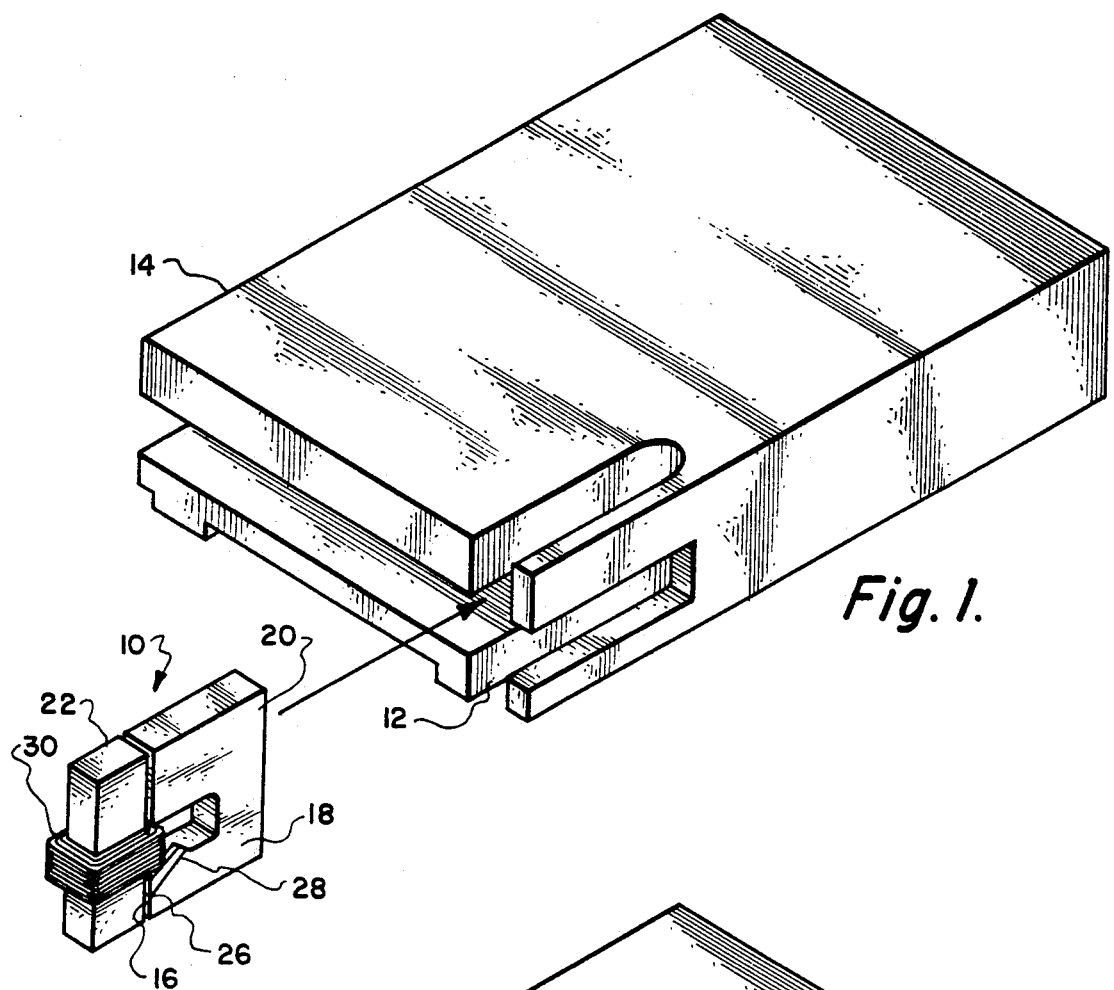
FIG. 1 is a perspective view of a core before insertion into a slider.
Figure 2:
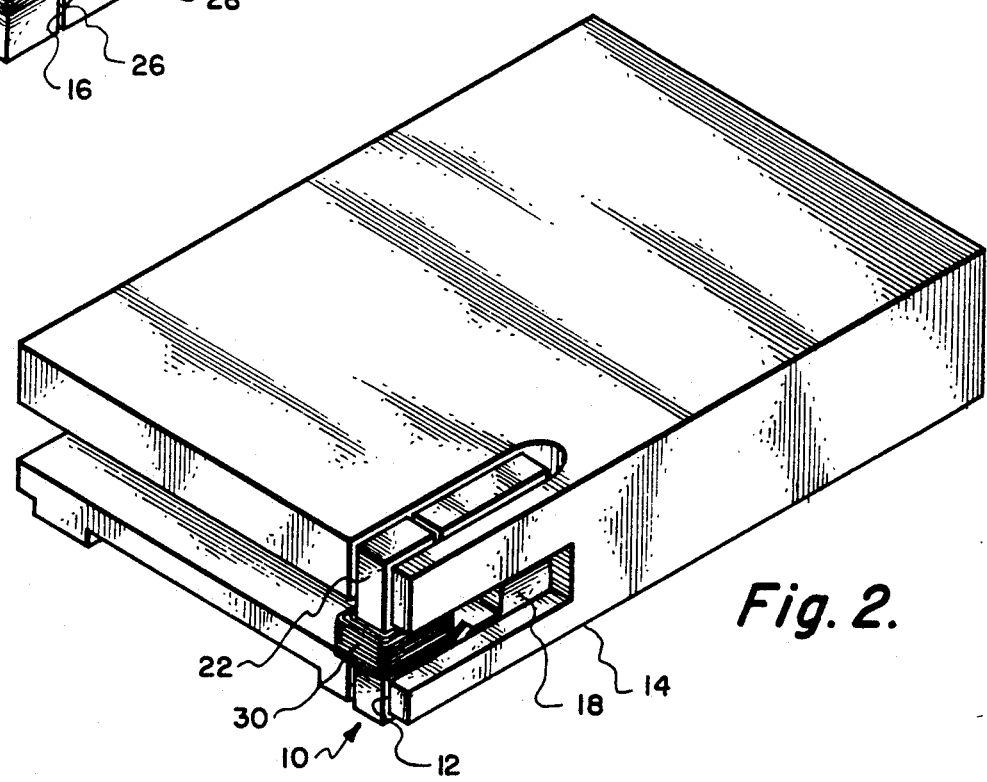
FIG. 2 is a perspective view of the core assembled with the slider.

The assembly of a prior art composite head is illustrated in FIGS. 1-2. The head is assembled by inserting a core 10 into the core receiving slot 12 on the slider body 14. The core is then front potted on the air bearing side (ABS) 16 of the slider with low temperature glass and then secured on the opposite face 18 of slot 12 with an adhesive such as epoxy.

The magnetic core 10 is formed of two pole pieces, usually a C-shaped bar 20 and an I-shaped bar 22. The two poles are spaced to form an interface including a gap region 26 and an adjacent fillet region 28. The poles are closely spaced at the gap region 26 to develop magnetic flux which communicates with the magnetic storage medium on the disk. The poles are more widely spaced at the fillet region 28 to inhibit leakage. The gap glass used to bond the pole pieces together is usually also filled into the fillet region 28 to reinforce the core. Otherwise, the core would be too fragile to withstand the forces encountered during winding the coil 30 onto the I-shaped bar 22.

The dampening material can be applied to the body of the slider before or after the core is secured into the slider body. Application of a dampening material to a small region does reduce readback oscillation. However, a raised dab or dollop of dampening material can interfere with the aerodynamics of the head. Furthermore, thin films of dampening material applied to wide areas are found to be more effective in dampening oscillations. The dampening material is suitably in contact with at least 10% of the surface area of the slider body, preferably in contact with at least 20% of the slider body. The dampening material is present in an amount effective to reduce the feedback voltage in the coil by at least 20%, preferably by at least 50%. The mass amount of the dampening material can be as low as 0.05 grams. Amounts above about 10 grams are not necessary. Typically about 0.1 to 1 gram of dampening material can be applied to the slider.

The dampening material can be inorganic or organic. It can be a viscous material applied by coating the surface of the slider following by drying and/or curing. Preferred materials are organic resins that do not contaminate the head, and especially resins that cure to form a film having a thermal coefficient of expansion not differing from that of the slider body by more than 20%, preferably no more than 10%.

The resin can be viscoelastic material such as a polyurethane resin, common resin or fabric adhesive tapes such as cellophane tape, or thermoset adhesive resins such as epoxies. The viscoelastic resins or tapes can collect dust and change the mass of the head. The thermoset resins, especially adhesive resins, form a secure bond with the surface and cure to a non-tacky surface. 3M Epoxy 2216—a modified epoxy containing modified amine accelerator—is a recommended dampening material since it is a widely used and approved material in composite head manufacturing.

The composite head is formed of ceramic sliders and ferrite cores conventionally used to manufacture composite heads. Suggested ceramics for use in the slider body are metal titanates, such as barium or calcium titanate or Photoceram. Sliders formed from hot isothermal pressed calcium titanate grains are preferred and are used in the heads exemplified in the invention. Single crystal ferrites (SCF) should have a thermal coefficient closely matching that of the slider body. Manganese-zinc ferrite closely matches the thermal coefficient of calcium titanate, and nickel-zinc ferrite closely matches the thermal coefficient of barium titanate.

A series of experiments were conducted to evaluate the effect of coating dampening material onto various faces of a slider body. The coating was conducted after an up and down slider body was assembled to the flexure suspension Epoxy 2216 was applied to the slider body by means of a sharp watch oiler. Care was exercised to avoid depositing epoxy on the ABS surfaces or to bridge the epoxy onto the flexure assembly. The epoxy was cured per manufacturer's instructions. Overnight curing at 75° F. is usually sufficient. The part can be post-cured at 150° F. for 120 minutes or at 200° F. for 30 minutes.

Coated and uncoated parts were tested for readback oscillation by the Post-write Oscillation Test ("PWOT"). The testing apparatus contained electronics to simulate the drive parameters in terms of write frequencies that the head was likely to encounter. It also included a voltage peak detector that would store the maximum voltage generated by the oscillation during the readback process. The test sequence was:

set the frequency to equal 8 MegaHertz at the head;
send a write current of 105 ma to the head;
write for approximately 100 micro seconds;
shut off this write current and immediately read head
  output for approximately 100 micro seconds;
detect the maximum oscillation voltage t hat occurs
  after 15 micro seconds from write current shut off;
repeat the test and detect maximum voltage;
continue repeated test, increasing the frequency by 1
  MegaHertz each time up to 13 MegaHertz; and
after peak oscillation voltages have been detected for all
  frequencies, record the maximum voltage seen during
  the test.

EXAMPLE 1

Figure 3:
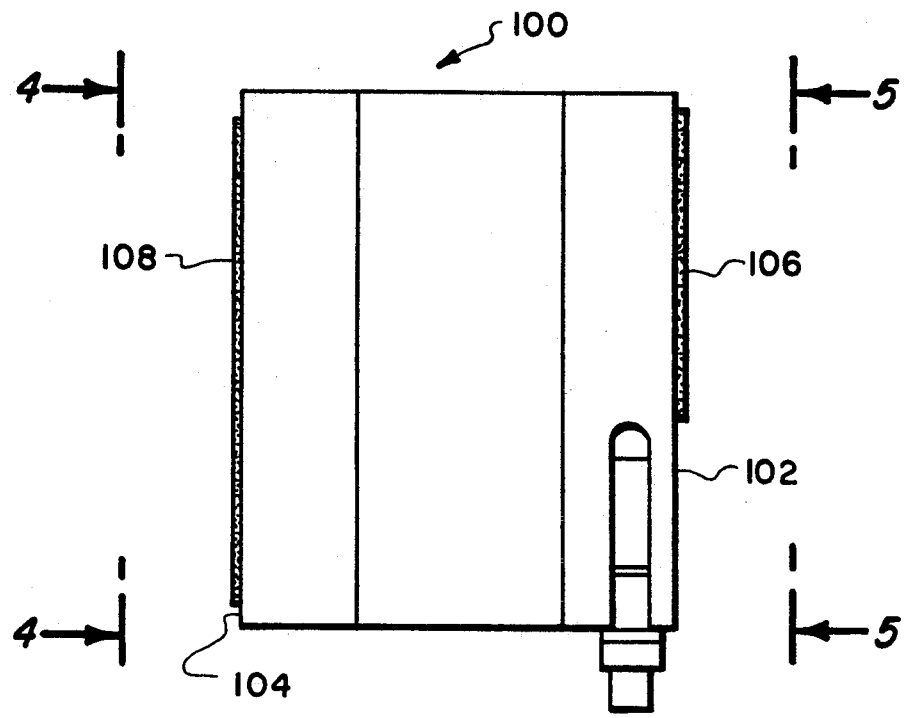
FIG. 3 is a bottom view of a ceramic slider body.
Figure 4:
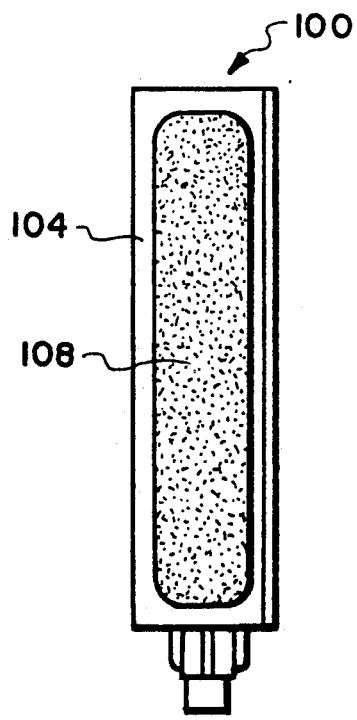
FIG. 4 is a side view of the non-core side of the slider taken along lines 4—4 of FIG. 3.
Figure 5:
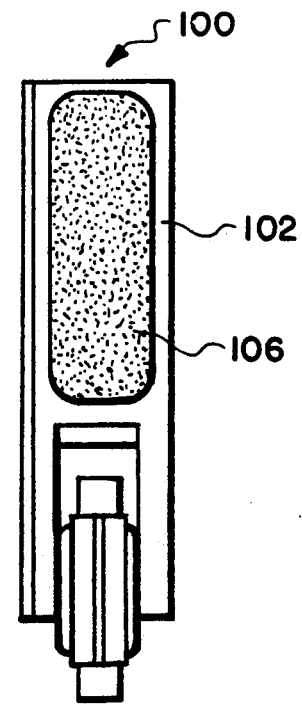
FIG. 5 is a side view of the core side of the slider body taken along lines 5—5 of FIG. 3.

PWOT values of five (5) heads 100 (one hundred) were measured. The side edges (core side 102 and non-core side of the slider Were coated with thin films 106, 108 of Epoxy 2216 and cured as shown in FIGS. 3, 4 and 5. The PWOT values were remeasured. Values are reported below:

TABLE 1

| Slider | UP HEAD | | DOWN HEAD | |
|---|---|---|---|---|
| | Initial Value mV | Dampened Value mV | Initial Value mV | Dampened Coated Value mV |
| 1 | 43.7 | 10.9 | 45.8 | 11.5 |
| 2 | 41.5 | 16.9 | 39.4 | 13.3 |
| 3 | 57.6 | 13.3 | 35.5 | 11.8 |
| 4 | 36.2 | 13.3 | 38.5 | 15.6 |
| 5 | 47.3 | 21.8 | 69.3 | 19.3 |

The reduction of readback oscillation was excellent, ranging from about 50% to about 75%. Oscilloscope readings showed oscillations of 46 micro volts at 19 micro seconds with a 22.3 MegaHertz amplitude when no dampening material is present. 34 micro volts at 17 microseconds with a 22.3 MegaHertz amplitude when one side is coated with epoxy, and 20 micro volts at 16 micro seconds with a 22.3 MegaHertz amplitude when both sides are coated with epoxy.

EXAMPLE 2

A large amount of epoxy 118, 120 was applied to both sides of a slider (No. 11) as shown in FIGS. 6–7 and cured.

EXAMPLE 3

A very small amount of 121, 122 of epoxy was applied to each side of 102, 104 slider (No. 12) as shown in FIGS. 8-9.

EXAMPLE 4

A very large amount of epoxy 124, 126 was applied to both sides of a slider (No. 13) as shown in FIGS. 10-11.

EXAMPLE 5

A dab or dollop 130 of epoxy was applied to the core side of a slider (No. 14) and two dabs 132, 134 of epoxy were applied to the non-core side of a slider as shown in FIGS. 12-13.

EXAMPLE 6

A very light amount of epoxy 136, 138 was applied to both sides of a slider as shown in FIGS. 14-15.

PWOT Test results follow:

| Slider | UP HEAD | | DOWN HEAD | |
|---|---|---|---|---|
| | Initial Value mV | Dampened Value mV | Initial Value mV | Dampened Value mV |
| 11 | 30 | 6 | 14 | 4 |
| 12 | 14 | 6 | 40 | |
| 13 | 30 | 10 | 10 | 6 |
| 14 | 30 | 10 | 20 | 10 |
| 15 | 140 | 46 | 10 | 6 |

Again, the application of dampening material significantly reduced oscillation in each case.

EXAMPLE 7

Epoxy 152 was applied to the trailing edge 150 of a slider body as shown in FIG. 16. The PWOT voltages were reduced from about 45.3 and 55.4 to about 19.4 and 24.8, respectively. This procedure gave as good a result as coating the sides of the slider and appears to be more readily adapted to commercial manufacture.

It is to be realized that only preferred embodiments of the invention have been exemplified and that numerous substitutions, alterations and modification are permissible without departing from the spirit or scope of the invention as defined in the following claims.

We claim:

1. A composite head comprising a ceramic slider body receiving a single crystal ferrite core exhibiting readback oscillation voltage following a write current, the improvement comprising:
   a thin coating of a dampening material secured to and covering at least 10% of the surface of the slider body in an amount sufficient to substantially reduce said readback oscillation voltage.

2. A composite head according to claim 1 in which the voltage of the readback oscillation is reduced by at least 20%

3. A composite head according to claim 1 in which the dampening material has a coefficient of thermal expansion differing by no more than 20% from the coefficient of expansion of the slider body.

4. A composite head according to claim 1 in which the dampening material is selected from adhesive tapes or organic resins.

5. A composite head according to claim 4 in which the dampening material is a coating of organic resin.

6. A composite head according to claim 4 in which the dampening material is present on the surface of the slider in an amount of at least 0.05 grams.

7. A composite head according to claim 6 in which the material is a thermoset resin that cures to a non-tacky condition.

8. A composite head according to claim 4 in which the coating of dampening material is present on at least one side edge of the slider body.

9. A composite head according to claim 8 in which a coating of dampening material is present on both sides edges of the slider body.

10. A composite head according to claim 8 in which the coating of dampening material is present on the trailing edge of the slider body.

11. A method of reducing the readback oscillation voltage after a write current in a composite head formed of a ceramic slider body containing a single crystal ferrite core comprising the step of:
    applying to a surface of the slider body a thin coating of a dampening material covering at least 10% of the surface of the slider body in an amount sufficient to reduce readback oscillation voltage by at least 20%.

12. A method according to claim 11 in which the dampening material has a thermal coefficient of expansion differing by no more than 20% from the thermal coefficient of expansion of the slider.

13. A method according to claim 11 in which the dampening material is an organic resin.

14. A method according to claim 13 in which the resin is curable when applied and further including the step of curing the resin on the surface of the slider body.

15. A method according to claim 11 in which the coating of dampening material is present on the surface of the slider body in an amount of at least 0.05 grams.

16. A method according to claim 15 in which the material is present on at least one side edge of the slider body.

17. A method according to claim 16 in which a coating of dampening material is present on both side edges of the slider body.

18. A method according to claim 11 in which the coating of dampening material is present on the trailing edge of the slider body.

* * * * *